Aug. 10, 1948.  C. W. CRUMRINE  2,446,638
FOCAL PLANE CURTAIN SHUTTER FOR CAMERAS
Filed Nov. 8, 1945  5 Sheets-Sheet 1

CHESTER W. CRUMRINE
INVENTOR
BY
ATTORNEYS

Aug. 10, 1948.   C. W. CRUMRINE   2,446,638
FOCAL PLANE CURTAIN SHUTTER FOR CAMERAS
Filed Nov. 8, 1945   5 Sheets-Sheet 2
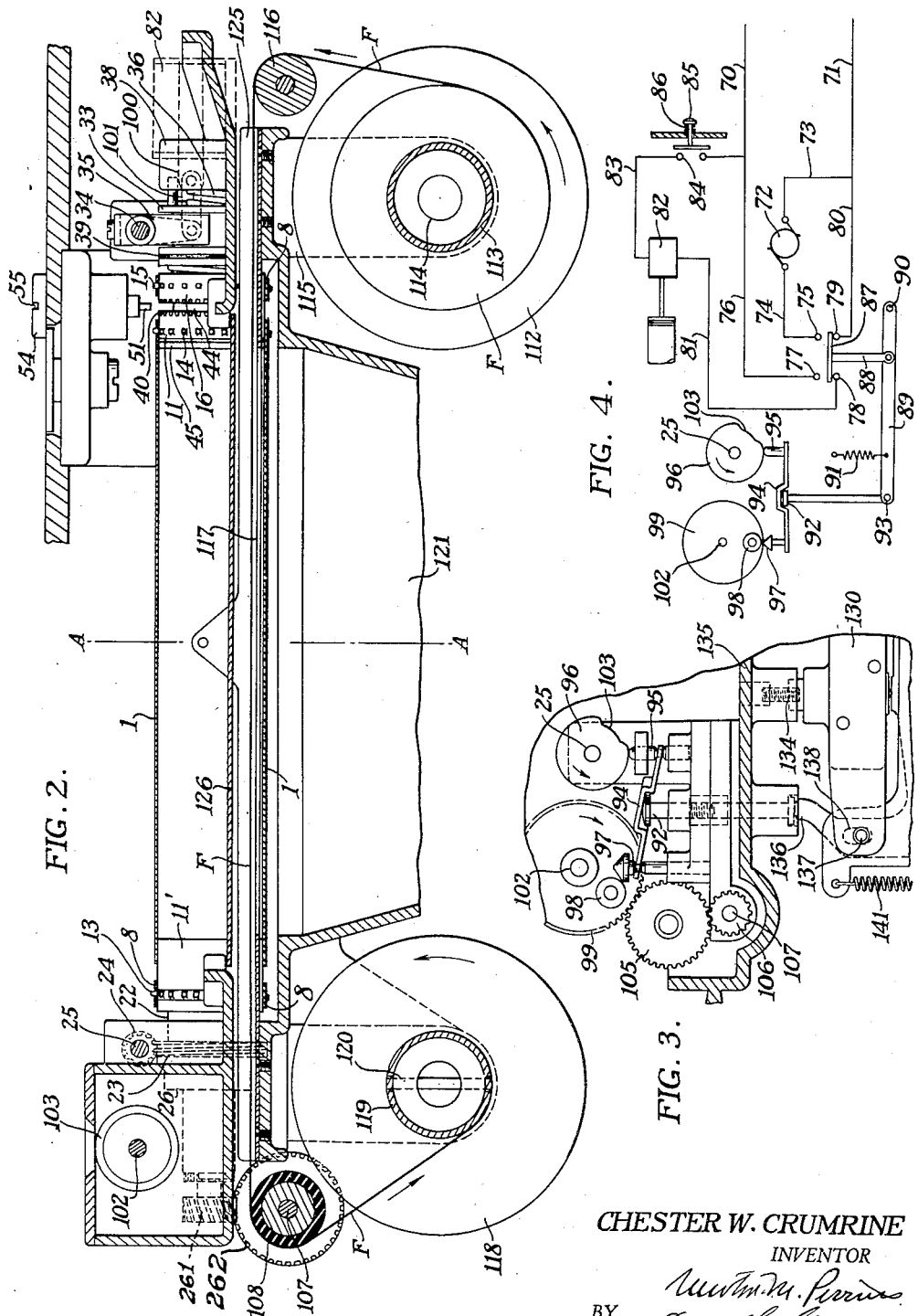
CHESTER W. CRUMRINE
INVENTOR
BY
ATTORNEYS

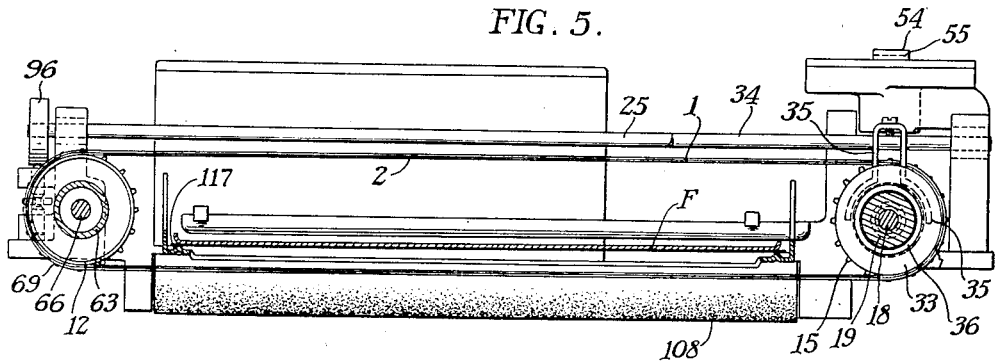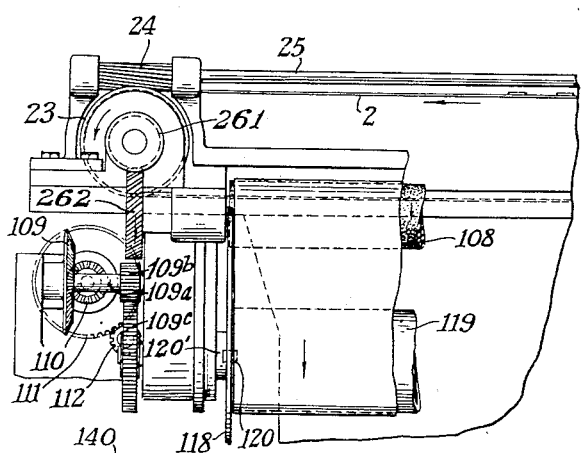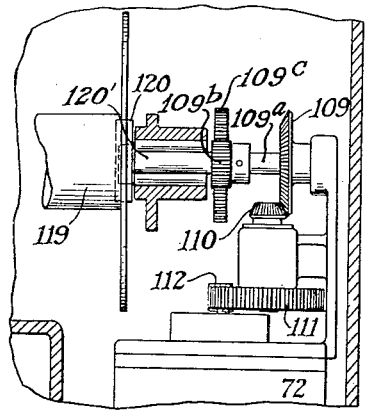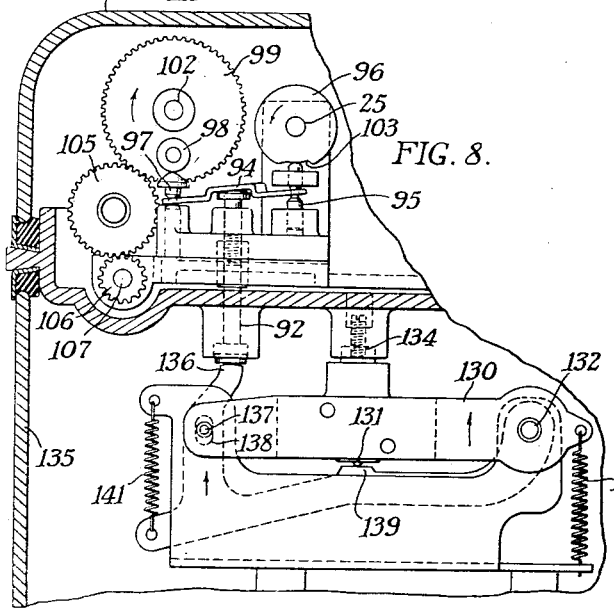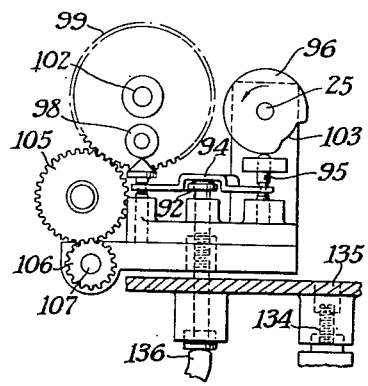

Aug. 10, 1948.     C. W. CRUMRINE     2,446,638
FOCAL PLANE CURTAIN SHUTTER FOR CAMERAS
Filed Nov. 8, 1945     5 Sheets-Sheet 4
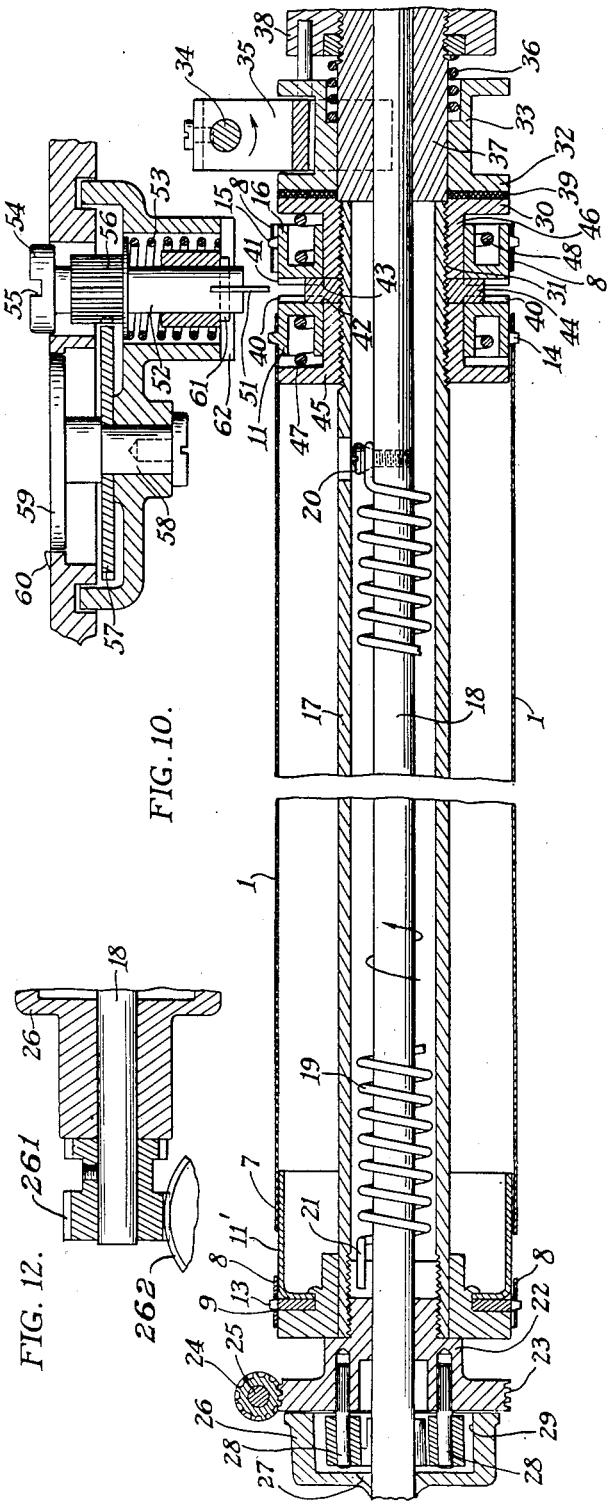
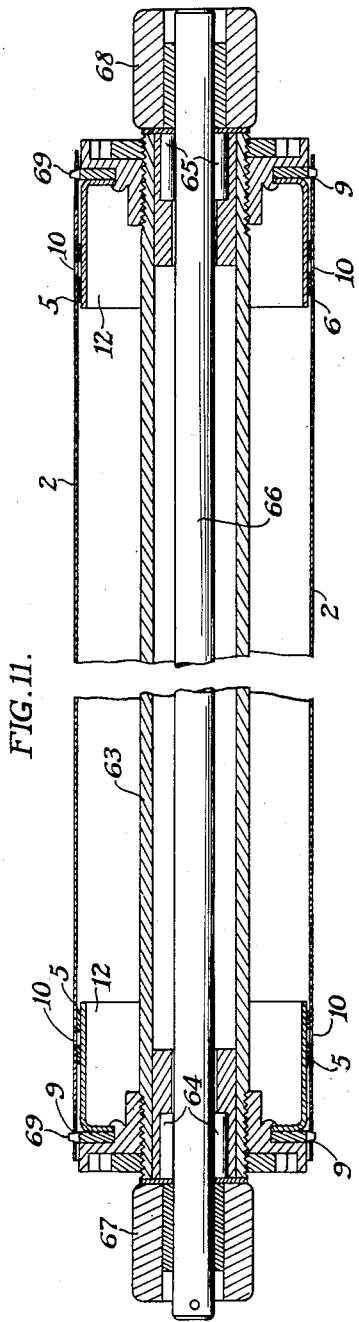
CHESTER W. CRUMRINE
INVENTOR
BY
ATTORNEYS Aug. 10, 1948.　　　C. W. CRUMRINE　　　2,446,638
FOCAL PLANE CURTAIN SHUTTER FOR CAMERAS
Filed Nov. 8, 1945　　　　　　　　　　　　5 Sheets-Sheet 5
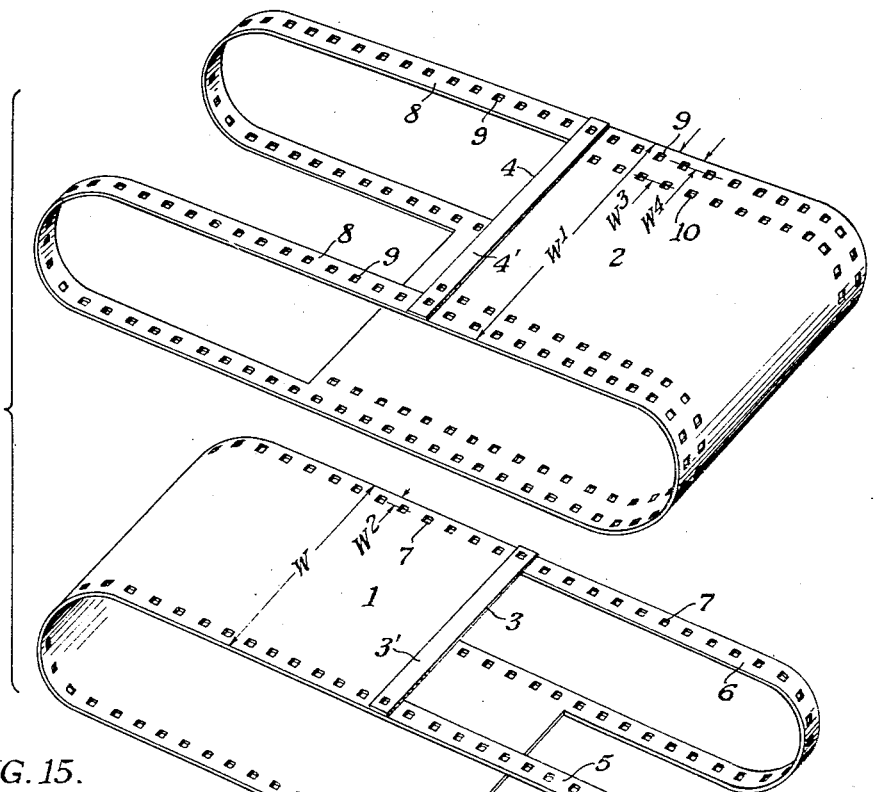
FIG.13.
FIG.15.
FIG.14.
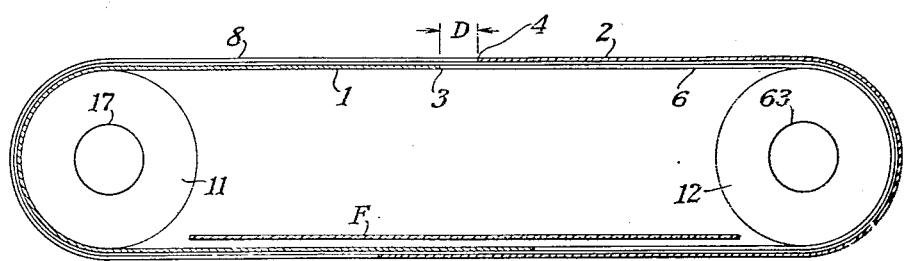
CHESTER W. CRUMRINE
INVENTOR
BY
ATTORNEYS Patented Aug. 10, 1948

2,446,638

UNITED STATES PATENT OFFICE 2,446,638

FOCAL-PLANE CURTAIN SHUTTER FOR CAMERAS

Chester W. Crumrine, Rochester, N. Y., assignor to Eastman Kodak Company, Rochester, N. Y., a corporation of New Jersey Application November 8, 1945, Serial No. 627,448

18 Claims. (Cl. 95—57)

This invention relates to photography and more particularly to focal plane shutters. One object of my invention is to provide a curtain-type of shutter particularly adapted for use in aerial cameras. Another object of my invention is to provide a curtain-type of shutter with which a number of differently-timed exposures can be obtained and in which an extremely simple mechanism is employed for setting the shutter for the differently-timed exposures. Another object of my invention is to provide a driving mechanism for the shutter curtains which will be immediately restored to its driving position after an exposure. A still further object of my invention is to provide a shutter with two curtain members carried by a pair of spaced rotatable supports in such a manner that one curtain may be adjusted relatively to the other curtain in order to alter an exposure slot between the two curtain members. A still further object of my invention is to provide a curtain shutter in which the curtain members may be mounted to slide one over the other to simplify the shutter adjusting mechanism. Other objects will appear from the following specification, the novel features being particularly pointed out in the claims at the end thereof.

In shutters commonly used for aerial cameras for ordinary reconnaissance work, it is customary to provide a shutter which may be adjusted for the desired exposure before the plane leaves the ground, and in which the same exposure will be constantly repeated throughout the trip. In some instances cameras have been provided with removable shutters which have only a single speed, so that the shutter giving the desired exposure may be fitted to the camera before each trip. The reason for doing this is to reduce the complications of the shutter mechanism which is usually necessary in shutters in which two curtains are provided with a variable width slot between the curtains through which an exposure is made. One of the objects of my invention is to provide a simple means by which curtains can be adjusted for a number of different exposures.

This application is a continuation-in-part of my application for Focal plane shutter, Serial No. 516,921, filed January 4, 1944, now abandoned.

Coming now to the drawings wherein like reference characters denote like parts throughout:

Fig. 2 is a longitudinal section through the shutter mechanism shown in Fig. 1;

Fig. 3 is a fragmentary detail part section showing a portion of the shutter control winding position, the parts being in the position they assume after the motor is started and after the curtain has stopped just completing an exposure;

Fig. 4 is a diagrammatic view showing the electric circuit control, the parts being shown in a normal or a rest position;

Fig. 5 is a transverse section through the shutter mechanism shown in Fig. 1, certain parts being shown in elevation;

Fig. 6 is a fragmentary detail showing a portion of the shutter winding mechanism;

Fig. 7 is a fragmentary detail showing a portion of the motor drive and its connection to a film spool;

Fig. 8 is a fragmentary detail partially in section showing a portion of the power drive control and the motor control switch;

Fig. 9 is a view similar to Fig. 8 with the switch omitted and with the rocker arm in a normal or rest position ready to make an exposure;

Fig. 10 is a longitudinal section through the adjusting roller and spool and showing an adjusting mechanism by which the relation of two curtains is varied to alter an exposure aperture between the curtains.

Fig. 11 is a sectional view through the opposite supporting roll to that shown in Fig. 10.

Fig. 12 is a fragmentary detail section showing a portion of a cam shaft drive.

Fig. 13 is a perspective view of a pair of curtain members removed from the shutter.

Fig. 14 is a somewhat schematic sectional view showing the relationship of the two shutter members and showing the shutter in its normal position of rest.

Fig. 15 is a side elevation of an adjustable cam illustrating a preferred embodiment of a portion of my invention.

Figure 1:
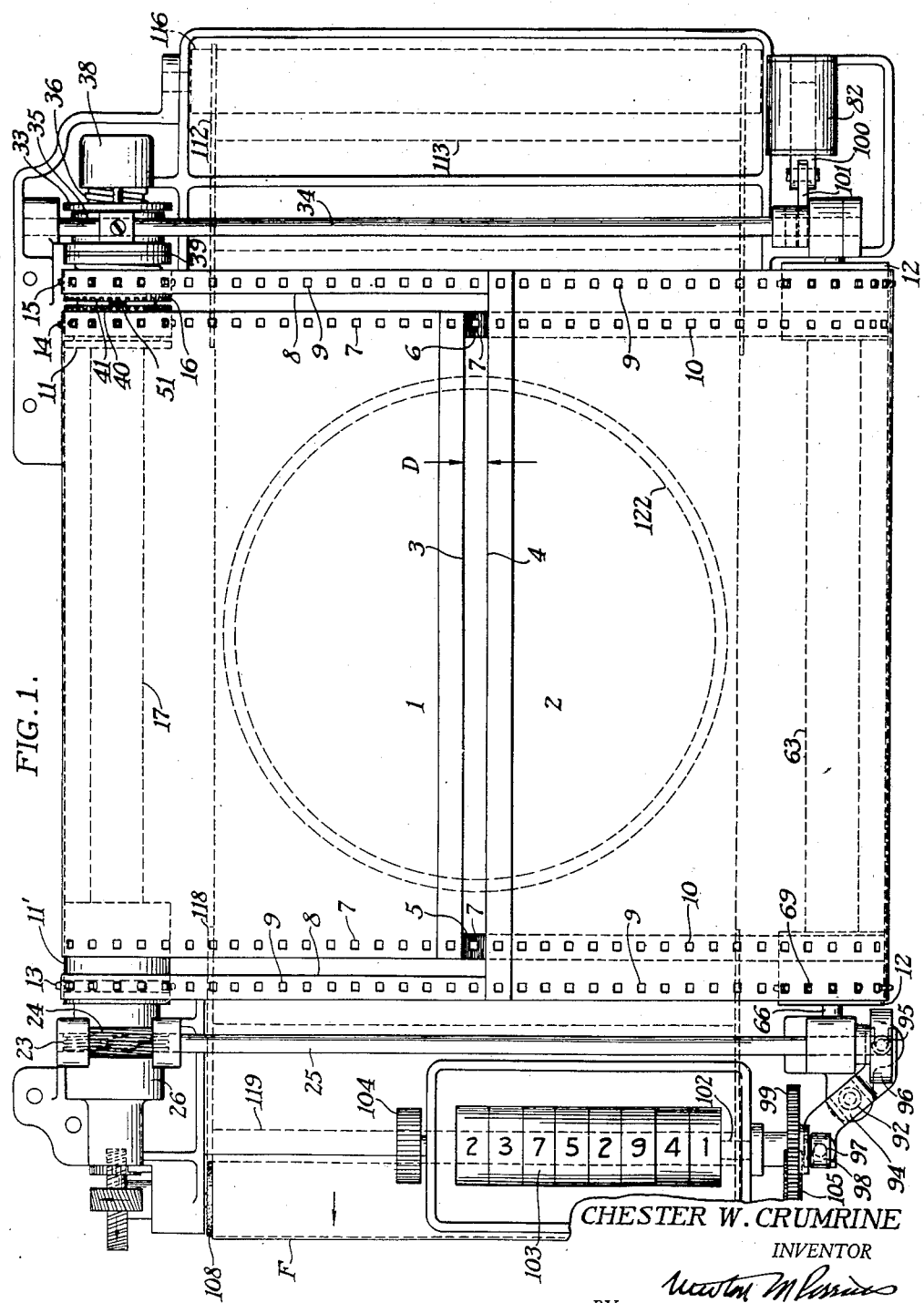
Fig. 1 is a top plan view of a shutter constructed in accordance with and embodying a preferred form of my invention, the curtains being shown in a position of rest.

My present shutter is of the type in which there is a pair of spaced rotatable supports about which two curtain members are looped, one at least partially overlying the other. With reference to Figs. 13 and 14, the curtain 1, with its attached or integrally-formed tapes 5 and 6, constitutes one curtain member, and the curtain 2, with its attached tapes 8, forms the second curtain member. In Fig. 13, the curtains are shown in perspective and they are shown in their relative positions of rest except that when these curtains are assembled, the curtain 1 lies inside of the tapes 11 and the tapes 5 and 7 forming a part of the curtain member 1 extending inside of and beneath the curtain 2. When these two curtains are so assembled, as is diagrammatically shown in Fig. 14, there is a space D between the ends of the curtain members 1 and 2 which constitutes an exposure slot, and at the other ends of the curtains 1 and 2, there is an overlap indicated at O which overlap will vary in extent in accordance with the variation of the width of the slot D, but in no case will the overlap O be insufficient to prevent light from entering between these curtains.

The curtains 1 and 2 are preferably formed of highly-polished metal, such as stainless steel of .002 or .003 inch in thickness, and the curtains are therefore slippery and one can readily slide relative to the other. In order to retain the two curtains in the proper relationship, the perforations 9 of curtain 2, and the perforations 7 of curtain 1, engage sprocket rollers 14 and 15 as will be more fully described later.

The slot D, between the curtain edges 3 and 4, extends transversely of the curtains 1 or 2 and, in the form of my invention shown in Fig. 13, reinforcing strips 4' and 3' are shown as extending completely across the two curtain members. These reinforcing strips may be omitted, if desired, but they are useful in that they make the edges of the curtains somewhat more rigid than they might otherwise be. However, it is pointed out that the drawings show these reinforcing members of much greater thickness than they actually are and that this is also true of the curtain members with their tapes, because with metal of the thickness indicated above, both the curtains themselves and the reinforcing strips are exceedingly thin, the two being in the order of .004 inch. Thus, the reinforcing strips do not prevent one curtain from sliding freely on the other when the exposure slot D is to be altered. Figs. 13 and 14 clearly indicate that each curtain member comprising a curtain and its tapes form, in effect, an endless band and, in this instance, curtain 2 forms an endless band of slightly greater length than curtain 1 because curtain 2 lies over the top of curtain 1. Also, as shown in Fig. 1, the width W of curtain 1 is less than the width W1 of curtain 2. The perforations 7 in curtain 1 are spaced a distance W2 from the edge of the curtain and the perforations 10 of the curtain 2 are spaced a distance W3 from the edge of curtain 2, so that the perforations 10 may coincide with the perforation 7 and so that the second row of perforations 9, which are spaced a distance W4 from the edge of the curtain, will lie completely outside of, or beyond the edge of curtain 1.

The reason for this spacing of the perforations is that in moving one curtain over the other to vary the width D of the exposure slot, the sprocket wheels 11 and 16 are moved to separate the sprockets, and the teeth 14 and 15 engaging the perforations 7 and 9 cause the tape 8 and the curtain 1 to separate during the setting operation. This movement between the sprockets 11 and 16 is comparatively slight—approximately .040 inch and since the tapes 8 are quite flexible, this movement can be readily accomplished. As will appear from the specification later, when the setting movement occurs, the curtains always have the relationship shown in Figs. 1, 13, and 14.

The two curtains are carried by a pair of spaced rotatable supports. These supports turn with, or upon, the spaced parallel shaft 18 and 66. The first rotatable support may consist of a tubular shaft 17 mounted to turn with the shaft 18 which shaft is a drive shaft adapted to be rotated by a spring 19 connected to the shaft at 20, the opposite end 21 of the spring 19 being attached to, or engaged in, a slot in the end of the ferrule 22 which carries a spiral drive gear 23 meshing with the drive spiral gear 24 carried by the cam shaft 25. At one end of the spaced rotatable support, there is a pair of sprocket wheels 11 and 16 having teeth 14 and 15 around their peripheries for engaging the perforations in the curtains and their tapes. At the opposite end of this rotatable support, there is a cap-shape roller 11', this roller having sprocket teeth 13.

In order to control the speed of rotation of the rollers 11, 11', and 16 (since all these rollers forming one rotatable support move together during an exposure), I provide a governor in a housing 26 in the form of a pair of weighted arms 27, best shown in Fig. 10. These weighted arms may each swing upon pins 28 carried by the ferrule 22 when the rollers 11, 11', and 16 are rotated. This governor may be of a known centrifugal type in which shoes may swing outwardly and brake against the cylindrical surface 29 when rotation reaches a predetermined speed.

The sleeve shaft 17 may be held against rotation by means of a brake, or clutch member consisting of a base plate 30, threadedly attached at 31 to the sleeve shaft 17, and there is a similar shaped face plate 32 attached to an axially sliding member 33 which may be moved when a brake shaft 34 moves a lever 35. This lever may move the brake shoe against the pressure of a spring 36 held on the sleeve 37 by means of a ring 38. Friction material 39 lies between the brake faces 30 and 32. When the lever 35 is rocked by the brake shaft 34 in the direction shown by the arrow in Fig. 10, the friction material 39 is disengaged from the brake face 30 permitting the spring 19 to drive the rollers 11', 11, and 16, constituting a first rotatable support through one cycle which is sufficient movement to cause the curtains to move from their Fig. 14 position so that the slot D will move in a straight line path until it reaches one rotatable support; the movement continuing around this support beneath a film F, around the second spaced rotatable support, and back to its position of rest shown in this figure. The second rotatable support may consist of a pair of spaced spools 12 carried by a sleeve shaft 63 and mounted to turn on roller bearings 64 and 65 on the shaft 66 which is supported in the bearings 67 and 68. At least one of the rollers 12 is preferably provided with sprocket teeth 69 and, if desired, both of the rollers may have sprocket teeth as shown.

When it is desired to set the shutter to produce different widths D between the facing edges 3 and 4 of the curtains 1 and 2, the setting mechanism shown in Fig. 10 may be used. The roller 16 and the adjacent roller 11 are provided with facing teeth 40 and 41 which normally engage similar teeth 42 and 43 carried by a disk 44. This disk is held between two threaded tubular members 45 and 46, the latter of which also forms the face 30 of the brake. The facing teeth 40, 41, 42, and 43 are shown on a considerably magnified scale in Fig. 10 since these teeth may be only .040 so that an actual movement of .020 may separate the teeth. The function of the teeth 40 and 41 is two-fold. First, these teeth may be separated by inserting a toothed member between them which may lift them away from the teeth 42 and 43, and away from each other, so that the roller 11 may be moved relatively to the roller 16. Second, the teeth 40 and 41 and the teeth 42 and 43, when engaged, cause the three rollers 11, 11', and 16 to move as a unit when the spaced rotatable supports for the curtains (one of which is formed by these rollers) turn to make an exposure. Springs 47 and 48 normally hold the parts clutched together with the generally radial teeth in contact. However, the teeth 14 and 15, carried by the rollers 11 and 16, may be moved about to permit the teeth 40 and 41 to become disengaged from the teeth 42 and 43 so that the curtains may be set for the required exposure. This is accomplished by means of a toothed member, or web, 51 which may constitute a two-toothed gear. This gear is so shaped that it may be turned to move the rollers 11 and 16 in opposite direction in increments equal to the spacing of the perforations 7 and 9. The web 51 is carried by a post 52 held by a spring 53 in its rest, or inoperative, position, shown in Fig. 10. When the knob 54 is lowered, the web 51 is passed between the spaced teeth 40 and 41 so that by turning the knob, the first action is to separate the roller 11 from the roller 16 disengaging the teeth 40 and 41 from the teeth 42 and 43. Further turning movement causes the two teeth of the setting member to move the teeth 40 and 41 in opposite directions, thereby causing the curtain 1 to move to or from the curtain 2 in such a manner that the width of the slot D between the curtains 1 or 2 is altered and, at the same time, the degree of overlap O between the opposite ends of the two curtains is altered but never eliminated. The shutter must be standing still when the setting occurs in the rest position of Fig. 1 or Fig. 14. The curtains move from this position and return to this position after each exposure, traveling in one way only.

In the present instance, the knob 54 is provided with a slot 55 which is manually manipulated with a coin or screw driver to set the shutter. Obviously, a hand knob could be used, if desired, but the structure shown is preferable for aviation cameras. The shaft 52 of the setting member includes a gear 56 meshing with a gear 57 mounted to turn with the stud 58 to thereby turn a dial 59 which is provided with a scale indicating the time of exposure when this scale is brought opposite to a pointer 60. This indicates the width of the exposure slot D. The knob 54 may be turned any number of turns to alter the exposure, but for the purpose this shutter was primarily designed for, three exposures have been found sufficient—1/250 of a second, 1/500 of a second, and 1/1000 of a second. Obviously, any required exposures can be provided. The dial 59 may be provided with indications of these shutter speeds or such additional speeds as may be deemed necessary.

The setting knob 54, in order to indicate the correct exposure, must be arranged to turn only when the web 51 lies between the roller 11 and the roller 16. For this purpose, I have provided a web 61 which prevents the shaft 52 from turning until the shaft has been lowered a distance sufficient to move the web 61 out of the slot 62. It is only possible then to turn the knob 54 when it has been depressed a distance sufficient for the web to lie between the gear teeth 40 and 41. The length of the gear teeth 56 is sufficiently great to always remain in contact with the teeth of gear 57 in the different positions of the shaft 52.

As above described, the curtain 1 is not as wide as the curtain 2 so that the perforations 7 in the curtain member 1 and in the tape 6, forming a part thereof, are positioned to engage only the gear teeth 14 of the roller 11. The perforations 10 are of similar spacing and are in alignment with the perforations 7 so that these perforations may engage the teeth 14 during a part only of the movement of the two curtains to make an exposure. The curtain 2 is considerably wider than the curtain 1 so that the perforations 9 in the curtain member 2 with its tapes 8 are adapted to engage the teeth 15 of the roller 16. When the two curtains are in their Fig. 1 position, there are no perforations in the curtain 2 engaging the sprocket teeth 14 and, consequently, when the sprocket teeth 14 and 15 are separated, one tape 8 of curtain member 2 may move relative to the curtain member 1 which may either slide a slight distance, or may permit the sprocket teeth 14 to slide in the aperture 7 a slight distance necessary to permit the separation of these rollers. While I have shown the perforations 9 and 10 and 7 to be generally rectangular in shape, I preferably make these perforations somewhat wider than the teeth 14 and 15, although this is not necessary.

I have shown the curtains 1 and 2 perforated on both sides because it is desirable on occasion to reverse the position of these shutters but it is not necessary to use all of the perforations at one time. As indicated in Fig. 1, the most desirable arrangement is to have the rotatable member consisting of the rollers 11', 11 and 16 provided with teeth as follows: Roller 11' is provided with teeth only for the outside row of perforations 9 of curtain 2. Roller 11 is provided with sprocket teeth 14 for the perforations 7 of curtain 1, and the perforations 10 of curtain 2. Roller 16 is provided with sprocket teeth 15 to engage only the perforations 9 of the curtain member 2. The reason for this arrangement is that when the curtains are in their rest position, it is possible for the curtain 1 to slide axially on the roller 11' when the roller 11 is moved axially for setting the curtains at the same time that the tap 8 moves axially and in a reverse direction due to the movement of the sprocket 16. As above explained, this sliding movement is very slight—.020 inch being sufficient—and, if desired, instead of sliding the curtain 1 axially, the apertures 7 can be made wide enough to permit the teeth 14 to slide in the apertures. However, this is not necessary.

The preferred arrangement for the second spaced rotatable support consisting of the shaft 66, the sleeve shaft 63, and the two rollers 12, is to provide a single sprocket 69 which will engage only the outer row of perforations 9 on the curtain 2 and which will not engage the apertures 7 of the curtain member 1. In fact, it is not necessary to provide any sprocket teeth on this rotatable support, but I have found that it helps to guide the curtains through the proper path and is preferable. It is also preferable to have the sprocket teeth 69 because the rollers 12 are driven solely through the curtains and it causes the second rotatable support to move smoothly when the first rotatable support is moved.

The rollers 11', 11, and 16 always move in one direction when making an exposure and they remain approximately in the rest position shown in Figs. 1 and 14 between exposures. The spring 19 is wound up after each exposure so that the direction of movement of the two rotatable supports for the curtains is never reversed. The winding movement is automatically accomplished by means of an electric motor. In Fig. 4, there is a schematic showing indicating a source of power 70 and 71 to which a motor 72 is connected through a wire 73 to the line and through a wire 74 to a switch contact 75. A second wire 76 is connected to the line wire 70 and to a switch contact 77. A second pair of switch contacts 78 and 79 may be connected by a wire 80 to the line wire 71 and by a wire 81 to a solenoid 82 which is connected by a wire 83 to a switch 84 which may be closed by depressing the button 85 against the action of a spring 86. A contact bar 87 may be attached to an arm 88 carried by a lever 89 pivoted at 90 and spring-pressed by a spring 91 into an upward position in which a pin 92 pivotally attached at 93 to the arm 89 is in engagement with the rocker arm 94. This rocker arm includes a pin 95 engaging a shutter cam 96 and an arm 97 engaging a roller 98 carried by a gear 99 connected to move with the motor 72.

As indicated in Fig. 2, the solenoid 82 carries a core 100 connected by a link 101 to a shaft 34 which is the brake shaft. Consequently, when the solenoid 82 is energized, it will rock the brake shaft 34, releasing the brake 30—32. When so released, the spring 19 will turn the rotatable supports and shutter to make an exposure.

With the parts in their rest position, if an operator should depress the push button 85, an exposure would be made in the following manner. Push button 85 closes the switch 84 and energizes the solenoid 82 through the following wires, 70, 83, 81, switch contacts 78 and 79, a contact bar 87, and a wire 80 leading to the line wire 71. Just as soon as the solenoid 82 releases the brake a sufficient distance, the spring 19 will turn the first rotatable support consisting of rollers 11', 11, and 16 so that this roller and the curtains 1 and 2 will start to move, thereby also moving the second spaced rotatable support carrying the two shutter members. As the shutter starts to move, the cam 96, which is carried by the cam shaft 25, starts to move in the direction shown by the arrow. This movement retains the rocker arm 94 in the rest position of Fig. 4 until the depression 103 in the cam comes opposite the pin 95 at which time the spring 91 will move the arm 89 upwardly breaking the connection between the switch contact 78 and 79 and deenergizing the solenoid 82 and making the contact between the switch contact 75 and 77 so that the motor 72 will be energized. Since the momentum of the first and second spaced rotatable supports and the two curtains is considerable, these supports will not be instantaneously stopped when the solenoid releases the brake 30—32. A certain amount of coasting will take place, this coasting being determined by the type of friction material 39 between the brake members 30 and 32 and the energy and speed of the parts. If desired, the cam 96 can be made an adjustable cam, as shown at 96A in Fig. 15, this cam preferably consisting of a pair of similar plates having notches 103A, one plate having a slot 104A through which passes a screw 105A so that the length of the cam 103A can be readily adjusted. However, after the shape of the cam has been once determined, the cam need not be made adjustable and the reduced area 103 can be made of the required length to permit the pin 95 to ride up on the outer edge of the cam through the coasting movement of the shutter parts. One feature of my improved shutter is that the shutter moves for quite a period of time before the exposure opening D crosses the film F and exposes that part of the film which lies behind the exposure frame 117. This long run before the exposure is made is desirable because it permits the shutter to get up to speed and, of course, the shutter continues to move quite awhile after the exposure is made and after the slot D has passed over the film F so that the film winding may start either just before or after the shutter members 1 and 2 reach their Fig. 14 position. The rest position is therefore not critical.

As soon as the solenoid 82 is deenergized, the brake 30—32 is applied by the spring 36 which moves the brake member 32 toward the brake member 30, pressing the brake lining 39 until the first rotatable support is brought to rest. This does not occur instantaneously but as the circuit is made for the motor 72, the motor will operate until its cam 99 makes a revolution. The second cam will start to move because the roller 98, which forms this cam, is carried by a gear 99 turning on a shaft 102. This shaft turns when the motor 72 turns and it will continue moving until the cam roller 98 makes one complete revolution and again engages the pin 97. It should be pointed out here that the rocker arm 94 closes the switch 75, 77, and 87, when either end of the rocker arm is up and when both ends of the rocker arm are down, switch 78, 79, and 87 closes, opening the first-mentioned switches. The switches referred to are formed by contacts 75, 77, and contact bar 87 and contact 78, 79, and contact bar 87. The cams 96 and 98 are arranged as follows: Referring to Fig. 1 it will be noted that the cam 96 is carried by a shaft 25 on which there is a worm-wheel 24 meshing with a spiral drive gear 23 shown in Fig. 10. Each time the sleeve shaft 17 and with it the rollers 11', 11, and roller 16, are turned the number of revolutions necessary to move the curtains 1 and 2 for an exposure, the cam 96 will be turned and the ratio is such that it makes one revolution for each exposure-making movement of the curtains.

Cam 98 is mounted on the gear 99 and is in the form of a roller positioned to engage pin 97. This gear 99 is a part of the counter mechanism best shown in Figs. 1 and 8. The gear 99 is carried by a shaft 102 which is connected to move a known type of counting mechanism 103—C to indicate the number of exposures. The usual type of counter-setting knob 104 may be used, if desired. Gear 99 meshes with a gear 105 which, in turn, meshes with a gear 106, this latter gear being carried by shaft 107. As shown in Fig. 2, shaft 107 carries a rubber roller 108 over which the film F passes. The rubber roller 108 and the shaft 107 are driven from the motor 72 indirectly. As illustrated in Fig. 7, the spool core 119 is driven through gears 109C, 109B, shaft 109A. Gear 110 is carried on the end of the same shaft as a reduction gear 111 meshing with the driving pinion 112 of the motor 72. Thus, the motor 72 will turn the cam 98 on the gear wheel 99 through the frictional contact of the film F and the rubber roll 108. The gear ratio is such that the roller 98 makes one revolution each time the film is wound.

From Fig. 2 it will be noted that the film F may be carried by a supply spool which consists of flanges 112 mounted on a core 113. A known type of spool-centering device 114 may be used, this centering device being carried by a downwardly-extending bracket 115. Film F may be led from the supply spool 112 over the guide roller 116 across an exposure frame 117 inside of the looped curtains 1 and 2 and thence over the rubber roll 108. From this roll the film passes to a take-up spool having a core 119 and flanges 118. A known type of winding key 120 may provide for driving the film spool; the winding key 120 may be carried on the end of a shaft 120' driven through the reduction gears 109C, 109B, from shaft 109A, this shaft being driven from the motor through the beveled gears 109 and 110 and through the reduction gears 111 and 112.

The exposure aperture 117 lies at the top of a downwardly-extending cone-shape wall 121, as indicated in Fig. 2, and an objective 122 is mounted on the bottom of the cone-shape member in the usual manner on an axis indicated by the line A—A of Fig. 2 and as diagrammatically illustrated in Fig. 1. The shutter structure which includes the curtain members 1 and 2 passes completely around that section of the film F which lies above the exposure frame 117 and, consequently, in threading the film it must be passed through the channel 125 (Fig. 2) leading from the idler roller 116 to the rubber roller 108. A presser plate 126 may be mounted and may be intermittently moved to hold the film F flat against the exposure frame 117 during the exposure period. Since this forms no part of my present invention, it will not be further described.

The switch mechanism diagrammatically shown in Fig. 4, as including contacts 76 and 77, contacts 78 and 79, and the contact bar 87, is designated broadly as a switch 130 in Fig. 8. This switch is preferably of the micro-switch type which includes a button 131 which requires only a slight amount of movement to actuate the switch. As shown in this figure, the switch 130 may be pivotally mounted at 132 and a spring 133 normally tends to rock the switch about its pivot in the direction shown by the arrow. An adjustable stop 134 limits the movement of the switch in one direction.

The plunger 92 which is controlled by the rocker arm 94 extends through the wall 135 of the camera casing and engages an upstanding arm 136 of a lever also pivoted at 132 and drawn by a spring 141 in the direction shown by the arrow. However, pin 137, passing into a slot 138, limits the possible upward movement of the lever 136. This lever includes a pad 139 positioned to contact with and operate the switch pin 131. The reason for this mechanism is when the camera is to be loaded, the body section 140 has to be removed from the casing 135 and this movement, by removing the pin 92 from the lever 136, would normally permit the switch pin 131 to be operated in such a manner that the motor circuit would be closed and the motor 72 would operate. However, as the operator lifts off the camera section 140, the spring 133 swings the switch 130 upwardly about its pivot 132 so that the lever 136, with its pad 139, is incapable of pressing the pin 131 to cause it to function. Also, as soon as the film has been loaded and the camera body section 140 applied to the casing 135, the switch operating pin 92 is again operatively positioned with respect to the lever 136 and the switch 130 is moved into its operative position by means of the stop 134.

The operation of this shutter is extremely simple. Before leaving on a photographic mission the operator turns the knob 54 to give the required exposure. This turning movement cannot occur until the knob is depressed to such an extent that the two-toothed gear 51 enters between the sets of facing teeth 40 and 41, and when the turning movement takes place teeth 40 and 41 are disengaged from teeth 42 and 43 and the roller 11 and spool 16 are turned in opposite directions to adjust curtains 1 and 2. This turning movement is in intervals equal to the spacing of the perforations 7 and 9 when the distance D between the shutter edges 3 and 4 is properly set for any of the selected exposures.

Having set the shutter aperture to the desired width, all the operator has to do to make an exposure is to depress the push button 86. Since this button is a switch of a circuit it may be located in any convenient place in a plane. Making the circuit first energizes the solenoid 82 releasing the shutter brake 30—32 and permitting the spring 19 to immediately drive the curtain. During the driving movement the cam 96 turns, holding the rocker arm 94 in a position to retain the switch arm 87 in the position shown in Fig. 4 during most of the movement of the curtains 1 and 2. However, towards the end of one cycle of movement the low spot 103 of the cam reaches the pin 95 so that the spring 91 may actuate the switch arm 87 making the motor circuit 72. When this is done the motor starts to wind the film F from the supply roller 112 to the take-up roller 118, power being applied through the film to roller 108 over which the film passes. Since roller 108 is turned and since this roller turns a shaft 107, the cam 98 on gear 99 is operated through the gears 106, 105 and shaft 102. Gear 106 is supported on shaft 107 carrying roller 108 frictionally driven by the moving film F. Therefore, since the film F is driven by the motor 73 through the gearing 111, 112, 110, 109, shaft 109A, gears 109B and 109C, shaft 25 carrying cam 96 derives its power through (Fig. 6) worm 24, worm wheel 23 and spiral gears 261, 262, the latter turning with the rubber roller 108. This cam includes a roller 98 which, as soon as the motor 72 is energized, leaves its Fig. 9 position and, as indicated in Fig. 3, permits the rocker arm 94 to move as indicated. This figure shows the position of the parts just after the motor has started and the curtain has stopped after completing a revolution. The motor will continue to function until the roller 98 has made one complete revolution and engages the pin 97 moving the rocker arm 94 downwardly and breaking the motor circuit as indicated in Fig. 9.

Repeated exposures are made either by repeated depressions of the button 86 manually or by any of the known mechanically-timed type of operating mechanisms.

While I have described a preferred embodiment of my invention, it is obvious that various modifications will suggest themselves to those skilled in the art.

I claim:

1. A curtain shutter for cameras including, in combination, a pair of spaced rotatable supports, one of said supports including two coaxially and adjacently-mounted toothed rollers, and a sleeve shaft carrying said rollers, and a roller coaxially positioned relative to said rollers but spaced therefrom, the other spaced rotatable support including a movable means for carrying curtains, two curtain members each including edge tapes forming with the curtains endless bands looped about the two spaced rotatable supports, each curtain member having the edge tapes of one curtain extending along the curtain portion of the other curtain members with one edge of each curtain in overlapping relationship and the opposite edges of each curtain spaced to form an exposure slot therebetween, and at least one tape attached to each curtain being perforated to engage one toothed roller, one curtain member being wider than the other curtain member and including a second row of perforations whereby one curtain member may engage both toothed rollers, and means for moving the two coaxially and adjacently-mounted rollers relative to each other both axially and rotatably to vary the slot between the curtains.

2. A curtain shutter as defined in claim 1 characterized by the curtains and their tapes being made of thin sheet metal.

3. A curtain shutter as defined in claim 1 characterized by the curtains and their tapes being made of thin sheet metal having a polished slippery surface to facilitate sliding one curtain over the other.

4. A curtain shutter as defined in claim 1 characterized by the coaxially and adjacently-mounted rollers including facing teeth normally movable towards each other by a spring and in which the means for moving the rollers includes said teeth and a toothed member movable between and engageable with the teeth.

5. A curtain shutter as defined in claim 1 characterized by the coaxially and adjacently-mounted rollers including facing teeth normally movable towards each other by a spring and in which the means for moving the rollers includes said teeth and a toothed member movable between and engageable with the teeth, and means for normally holding the toothed member out of engagement with said teeth.

6. A curtain shutter as defined in claim 1 characterized by the coaxially and adjacently-mounted rollers including facing teeth, a member mounted on the sleeve shaft having teeth facing in opposite directions to be engaged by the facing teeth of said rollers and to hold said teeth in a spaced position whereby said toothed member may be entered between said facing teeth to move said rollers both axially and radially.

7. A curtain shutter as defined in claim 1 characterized by the coaxially and adjacently-mounted rollers including facing teeth normally movable towards each other by a spring and in which the means for moving the rollers includes said teeth and a toothed member movable between and engageable with the teeth, and a guideway for the toothed member for guiding said member into an operative tooth engaging position.

8. A curtain shutter as defined in claim 1 characterized by the coaxially and adjacently-mounted rollers including facing teeth normally movable towards each other by a spring and in which the means for moving the rollers includes said teeth and a toothed member movable between and engageable with the teeth, and a guideway for the toothed member for guiding said member into an operative tooth engaging position, a handle for manually turning said toothed member, said guideway restraining said handle from turning when said toothed member is in an inoperative position out of engagement with the facing teeth of the rollers.

9. A curtain shutter for cameras including, in combination, a pair of spaced rotatable supports, two curtain members, each including edge tapes forming with the curtains endless loops extending about and supported by the rotatable supports, one curtain being wider than the other curtain, the narrower curtain and its edge tape having perforations along one edge, the wider curtain and its tape having perforations along one edge and a second row of perforations in the wider curtain aligned with the perforations in the narrower curtain and its tape, one rotatable support including toothed rollers for engaging the perforations of both curtains, the two curtains and their tapes lying in overlapping relationship at one end of the curtains and in spaced relationship at the other end of the curtains to provide a transverse exposure slot, the curtains and the rotatable supports having a normal position of rest in which the toothed rollers are each engaged solely by separate curtains, and means for moving one toothed roller relative to the other for altering the relationship of one curtain relative to the other to change the exposure slot therebetween.

10. The curtain shutter defined in claim 9 characterized by the means for moving one toothed roller relative to the other being manually operable only when the toothed rollers and curtain members are in their normal position of rest.

11. The curtain shutter defined in claim 9 characterized by the means for moving one toothed roller relative to the other being manually operable only when the toothed rollers and curtain members are in their normal position of rest, and means geared to the means for moving one toothed roller relative to the other for indicating the width of the transverse exposure slot between the spaced ends of the two curtains.

12. The curtain shutter defined in claim 9 characterized by the means for moving one toothed roller relative to the other being manually operable only when the toothed rollers and curtain members are in their normal position of rest, said means for moving one toothed roller relative to the other including a manually operable handle normally spring-held out of an operative toothed roller adjusting position.

13. A curtain shutter for cameras including, in combination, a pair of spaced rotatable supports, two curtain members, each including edge tapes forming with the curtains endless loops extending about and supported by the rotatable supports, one curtain being wider than the other curtain, the narrower curtain and its edge tape having perforations along one edge, the wider curtain and its tape having perforations along one edge and a second row of perforations in the wider curtain aligned with the perforations in the narrower curtain and its tape, one rotatable support including toothed rollers for engaging the perforations of both curtains, the two curtains and their tapes lying in overlapping relationship at one end of the curtains and in spaced relationship at the other end of the curtains to provide a transverse exposure slot, each curtain member being made of thin sheet metal having at least portions of one sheet metal curtain lying in contact with at least portions of the other sheet metal curtain as the curtains and their tapes encircle the two spaced rotatable supports, and mechanism, including two relatively movable adjacent and coaxial toothed rollers, the teeth of one roller engaging perforations in one curtain and the teeth of the other roller engaging perforations in the other curtain member for sliding one metal curtain member over the other metal curtain member for adjusting the exposure slot therebetween.

14. A curtain shutter for cameras including, in combination, a pair of rotatable supports in parallel spaced relation, a narrow curtain and tapes forming an endless curtain member extending about said rotatable supports, said curtain extending over half the distance about the supports, a wide curtain and tapes forming a second curtain member extending about said rotatable supports, said curtain extending over half the distance about the supports, one transverse edge of each curtain being spaced from the other to form an exposure slot therebetween, the two opposite transverse edges of the curtains lying in overlapping relationship, said curtains having a normal position of rest in which said exposure slot is opposite the overlapping ends of the curtains, parallel rows of equally spaced perforations adjacent edges of the wide and narrow curtains and their tapes, a second row of perforations in the wide curtain spaced to register with the row of perforations in the narrow curtain, one rotatable support including toothed rollers for engaging said perforations, one for engaging the row of perforations in the wide shutter member, the other for engaging the row of perforations in the narrow shutter member and the second row of perforations in the wide shutter spaced to register with the perforations in the narrow curtain, and mechanism for moving the toothed rollers to move one curtain member relatively to the other for adjusting the slot therebetween, said mechanism moving the toothed rollers in increments of the spacing of one tooth and including a manually operable handle for operating said mechanism.

15. A curtain shutter for cameras including, in combination, a pair of rotatable supports in parallel spaced relation, a narrow curtain and tapes forming an endless curtain member extending about said rotatable supports, said curtain extending over half the distance about the supports, a wide curtain and tapes forming a second curtain member extending about said rotatable supports, said curtain extending over half the distance about the supports, one transverse edge of each curtain being spaced from the other to form an exposure slot therebetween, the two opposite transverse edges of the curtains lying in overlapping relationship, said curtains having a normal position of rest in which said exposure slot is opposite the overlapping ends of the curtains, parallel rows of equally spaced perforations adjacent edges of the wide and narrow curtains and their tapes, one rotatable support including toothed rollers for engaging said perforations, one for engaging the row of perforations in the wide shutter member, the other for engaging the row of perforations in the narrow shutter member, the said one rotatable support including the toothed rollers at one end and a curtain support at the opposite end on which a curtain may slide axially of the support, a sleeve shaft carrying the toothed rollers for axial and radial movement, a washer with axially facing teeth carried by the sleeve shaft between the toothed rollers, axially facing teeth on the rollers for engaging teeth on the washer for holding the rollers together, spring means for normally engaging the roller and washer teeth, a manually operable toothed member positioned for movement between the teeth of the toothed rollers, means for moving the toothed member between and into engagement with the toothed rollers when the shutter curtains are in their normal rest position whereby said toothed rollers may be slid axially, disengaging their teeth from the teeth of the washer and moving the toothed rollers, thereby moving one curtain relative to the other for adjusting the width of the exposure slit.

16. A curtain shutter for cameras including, in combination, a pair of rotatably mounted spaced supports, one support comprising a shaft, a first fixedly mounted roller at one end thereof, a sleeve shaft at the other end, a washer on the shaft including axially facing teeth, a pair of rollers constituting second and third rollers slidably mounted on the sleeve shaft, each roller including axially facing teeth adapted to engage said washer teeth to be held against rotative movement thereby, spring means for holding the second and third roller teeth in engagement with the washer teeth, radially extending teeth on the second and third rollers, two curtain members each comprising a curtain and edged tapes with at least one edge of each curtain and tape perforated, the two curtains being looped around the pair of rotatably mounted supports in endless bands, one shutter member at least partially overlying the other and one shutter member being wider than the other whereby one shutter may engage only the first and second rollers, the other curtain engaging the first, second, and third rollers, the row of perforations in the wide curtain engaging the third roller, the row of perforations in the other curtain engaging the second roller, and a second row of perforations in the wide curtain adapted to engage the second roller, said curtains having a normal rest position in which only the tapes of the wide curtain member engage only the first and third roller and in which only the curtain of the other curtain member engages the first and second rollers, and a mechanism including teeth insertable between the axially facing teeth of the second and third rollers for moving the rollers axially and radially thereby sliding one curtain relative to the other, one end of one curtain being spaced from the other to form an exposure slot and the other ends of the curtains lying in overlapping relationship whereby moving the second roller relative to the third roller may adjust the exposure slot between the curtains.

17. A curtain shutter as defined in claim 15 characterized by the first roller also including radial teeth, and a row of perforation in the wide curtain member for engaging said teeth.

18. A curtain shutter as defined in claim 15 characterized by the first roller also including radial teeth, and a row of perforation in the wide curtain member for engaging said teeth, the other curtain lying completely out of engagement with the teeth of the first roller.

CHESTER W. CRUMRINE.

REFERENCES CITED

The following references are of record in the file of this patent:

UNITED STATES PATENTS

| Number | Name | Date |
|---|---|---|
| 891,770 | Garfield | June 23, 1908 |
| 1,379,189 | King | May 24, 1921 |
| 2,309,300 | Briechle et al. | Jan. 26, 1943 |